United States Patent [19]

Kulle et al.

[11] Patent Number: 5,028,204
[45] Date of Patent: Jul. 2, 1991

[54] GAS COMPRESSOR HAVING A DRY GAS SEAL ON AN OVERHUNG IMPELLER SHAFT

[75] Inventors: Vaclav Kulle, Blind Bay; Robert A. Peterson, Calgary, both of Canada

[73] Assignee: NOVA Corporation of Alberta, Calgary, Canada

[21] Appl. No.: 448,643

[22] Filed: Dec. 11, 1989

[30] Foreign Application Priority Data

Dec. 13, 1988 [CA] Canada .................................. 585806

[51] Int. Cl.5 .......................... F01D 3/00; F01D 11/00
[52] U.S. Cl. .................................... 415/105; 415/107; 415/112; 415/172.1; 415/230; 415/170.1
[58] Field of Search ............... 415/104, 105, 107, 110, 415/111, 112, 229, 230, 106, 170.1, 172.1, 173.5, 174.5; 277/81 R, 24, 96, 96.1

[56] References Cited

U.S. PATENT DOCUMENTS

| | | | |
|---|---|---|---|
| 2,851,889 | 3/1957 | Pedersen | 415/107 |
| 3,459,430 | 8/1969 | Ball | 415/112 |
| 3,558,238 | 1/1971 | Herpt | 415/112 |
| 3,822,102 | 7/1974 | Erickson et al. | 415/104 |
| 3,999,882 | 12/1976 | Purton | 415/112 |
| 4,413,946 | 11/1983 | Marshall et al. | 415/28 |
| 4,557,664 | 12/1985 | Tuttle et al. | 415/105 |
| 4,697,981 | 10/1987 | Brown et al. | 415/104 |

Primary Examiner—Edward K. Look
Assistant Examiner—Hoang Nguyen
Attorney, Agent, or Firm—Stevens, Davis, Miller & Mosher

[57] ABSTRACT

A gas compressor, particularly of the kind for boosting pressure in gas transmission and petro chemical process, has an impeller mounted on an impeller shaft of the overhung type mounted on front and rear bearings and having at least one impeller mounted between the front bearing and a front end of the shaft. Annular seals are provided co-axial with the shaft which separate an inner space communicating with the shaft front end from the suction end gas space which lies outside the seals. The seals include an outer seal and an inner dry gas seal. Pressurized process gas is supplied between these seals at a pressure higher than suction pressure and is vented from the inner gas space at a pressure well below suction pressure to limit gas pressure forces on the front end of the shaft.

16 Claims, 2 Drawing Sheets

GAS COMPRESSOR HAVING A DRY GAS SEAL ON AN OVERHUNG IMPELLER SHAFT

FIELD OF INVENTION

The invention relates to centrifugal or axial flow compressors, and especiallly compressors which operate at high pressures, such as compressors used in gas transmission and petro chemical process for boosting pressure. The invention provides an improved method of reducing and controlling the axial forces on a compressor shaft of the overhung type.

PRIOR ART

In most types of compressors commonly used for boosting pressure in gas transmission lines and petrochemical process, one or more centrifugal or axial flow impellers are mounted on a shaft and constitute a rotor which rotates within a gas space in the compressor housing to move gas from a suction inlet to a discharge outlet of the space, the shaft being of the overhung type wherein the impeller or impellers are in front of the bearings. This type of compressor will be referred to as being "of the type described". Such a compressor is usually coupled to a gas turbine which provides the drive.

In such compressors, all of the space in which the impellers operate is pressurized at least to the pressure of the gas to be compressed which can be several hundred psi, and commonly is over 1,200 psi. This pressurized gas normally surrounds the front end of the shaft, and seals are used to prevent the gas from leaking into the bearings at the rear end of the shaft. Oil seals have traditionally been used for this purpose, but more recently, dry gas seals have been effectively developed for this purpose. In such seals, the sealing function is provided by a very thin film of gas which leaks between two relatively rotating annular surfaces. The leakage across the faces of such dry gas seals is quite low even when pressure differentials are quite high.

Gas compressors have large axial thrust imposed on the rotor by gas pressure and by gas momentum acting on the impellers. In an overhung compressor of the type described, these forces may be partially balanced by process gas pressure acting on the front end of the shaft. This, however, is a substantially constant force, whereas the momentum and gas pressure forces on the impeller increase with impeller speed. To reduce the resultant forces, a so-called balance piston has been used which surrounds the shaft rearwardly of the impeller or impellers, and which is exposed on its front side to discharge pressure and on its rear side to suction pressure via a bleed line. Such pistons add weight and length to the impeller shaft and involve substantial leakage of gas from the high pressure side to the low pressure side of the compressor. Also, this arrangement may lead to undesirably high loads being applied to the shaft, caused by the high pressure gas at its front end, at low spped conditions when there are negligible momentum gas forces on the impeller. The present invention both relieves this front end force, and provides a means for regulating thrust on the shaft which obviates the need for a balance piston. The invention allows smaller thrust bearings or magnetic thrust bearings to be used in place of large thrust bearings now used.

SUMMARY OF THE INVENTION

In accordance with the invention, in a gas compressor of the type described, annular sealing means are Provided at the front end of the shaft and co-axial therewith, and which separate an inner gas space, communicating with the shaft front end, from a suction end of the gas space which lies outside the sealing means. These sealing means include an outer annular seal which is usually a labyrinth seal, an inner dry gas seal, and means for supplying pressurized process gas between these seals at a pressure higher than the suction end gas pressure, while the inner gas space is vented to a pressure below the suction gas pressure. Accordingly, only a part of the front end of the shaft is subjected to high pressure. The pressure of gas in the inner gas space may be regulated to achieve the desired balancing.

The invention is particularly valuable where it is desired to use all magnetic bearings for the shaft, since the load applied to a magnetic thrust bearing must be kept within certain limits. A modification of the invention uses signals from a magnetic thrust bearing to regulate the pressure in the inner gas space and thus ensure that the thrust is held within such limits even with widely differing conditions within the compressor.

BRIEF DESCRIPTION OF THE DRAWINGS

The invention will be more particularly described with reference to the accompanying drawings, in which.

DETAILED DESCRIPTION

Figure 1:
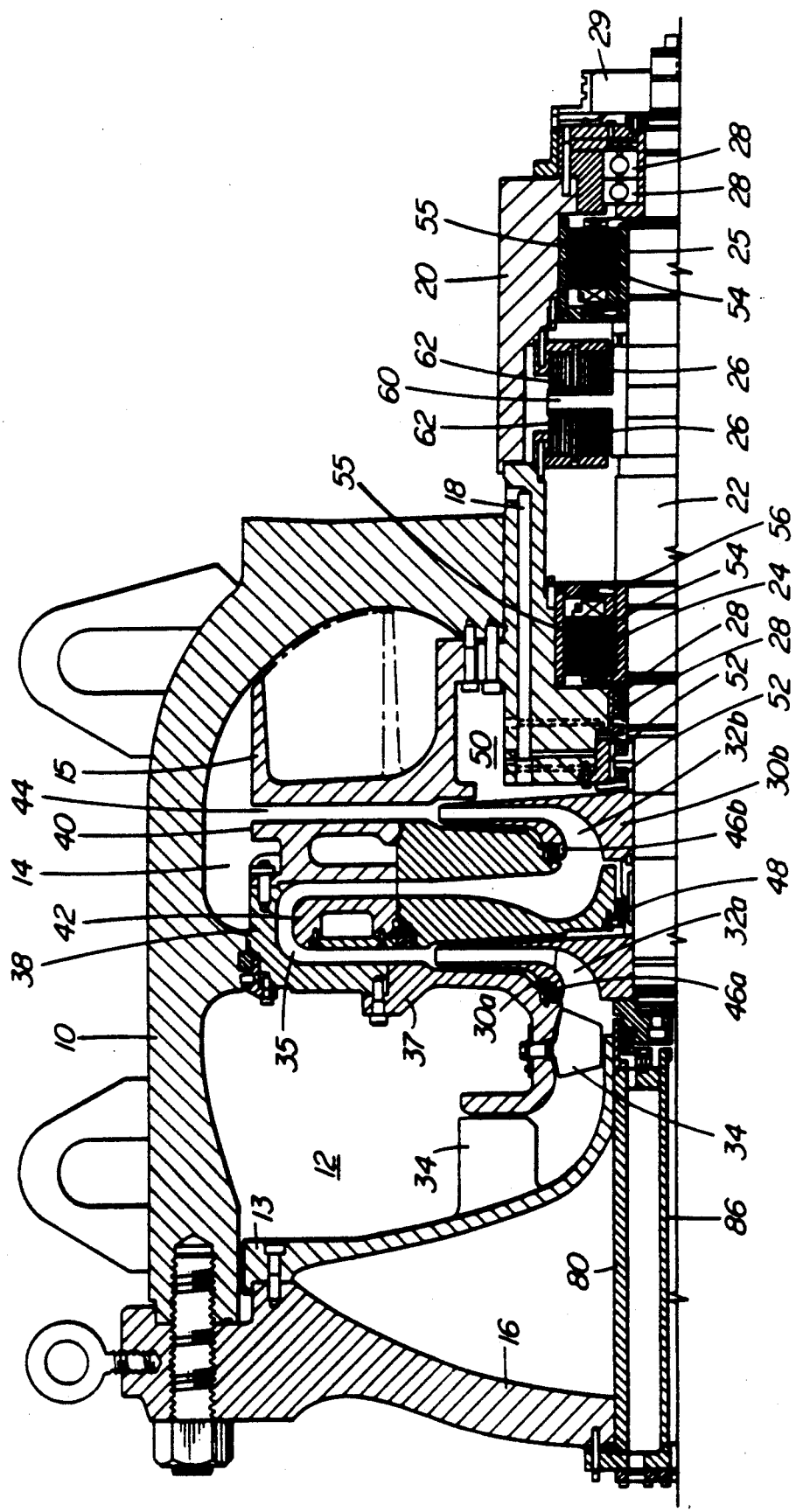
FIG. 1 is partial longitudinal section through a two stage compressor embodying the invention.

FIG. 1 shows a longitudinal sectional view through the upper part of a gas compressor down to the shaft centre-line CL. The compressor has a casing 10 with suction (inlet) passageway 12 defined by inlet volute 13 and discharge (outlet) passageway 14 defined by exit volute 15; the lower part of the compressor being generally similar except for entrance and exit passageways. The term "suction" in this connection actually means a positive pressure, usually of several hundred psi. The front end of the casing is closed by compressor door 16, and the rear end is closed by front radial and thrust bearing housing 18 to which is attached the rear radial and thrust bearing housing 20; these housings have the bearings which support the shaft 22. These bearings include a front and a rear magnetic radial bearing 24 and 25 respectively, a magnetic thrust bearing 26, and auxiliary ball bearings 28 which support the shaft in case the magnetic bearings become inoperative. The shaft has a coupling 29 whereby it is connected to driving means such as a gas turbine.

The shaft 22 carries first and second stage centrifugal impellers 30a, 30b, having vanes which define passageways 32a and 32b. The first stage impeller passageways 32a connect passageways of the suction end of the gas space defined by guide vanes 34 to passageways 35 defined by a compressor inlet diaphragm 37, an intermediate diffuser 38 and outlet diffuser 40, and an intermediate diaphragm 42. The passageways 35 lead to the second stage passageways 32b which deliver the gas through passageways 44 between diffuser 40 and exit volute 15 and which lead to outlet passageway 14. Labyrinth seals 46a and 46b are provided between the casing and the inlet end of each impeller; an interstage labyrinth seal 48 is provided between the shaft and diaphragm 42.

Some of the gas delivered by the impeller 30b enters the cavity 50 within the exit volute 15, and the space between this cavity and the front auxiliary bearings 28 is sealed by a pair of so-called dry gas seals indicated at 52. These dry gas seals are of a generally known type having closely spaced, relatively moving annular surfaces. Ducts may be provided for example to vent the gas from between the two stages of the seals, so that an explosive gas such as natural gas can be removed from the vicinity of the compressor and a safe purge gas can be fed in downstream of the seals so that the only gas leaking into the bearing space is non-explosive. Such passageways are generally conventional and will not be further described.

The front and rear magnetic radial bearings 24 and 25 are also generally conventional, having a rotor 54 held radially by a stator 55. The bearings include radial sensors 56 which are sensitive to the position of the shaft and correct the currents in the stator coils accordingly.

The magnetic thrust bearing 26 is conventional as such, although it has not previously been used in compressors of this kind since the gas forces acting o such compressors are usually too large for reliance to be placed on a magnetic thrust bearing. Here, the bearing comprises an annular rotor 60 rotating within a stator 62. The field windings of the stator 62 are connected to electrical detectors which are sensitive to the axial position of the shaft, and provide signals for a purpose to be described.

Apart from the use of the magnetic thrust bearing, the general features of the compressor so far described are conventional. The invention is concerned with the arrangement at the front end of the compressor shaft, which is shown in detail in FIG. 2.

Figure 2:
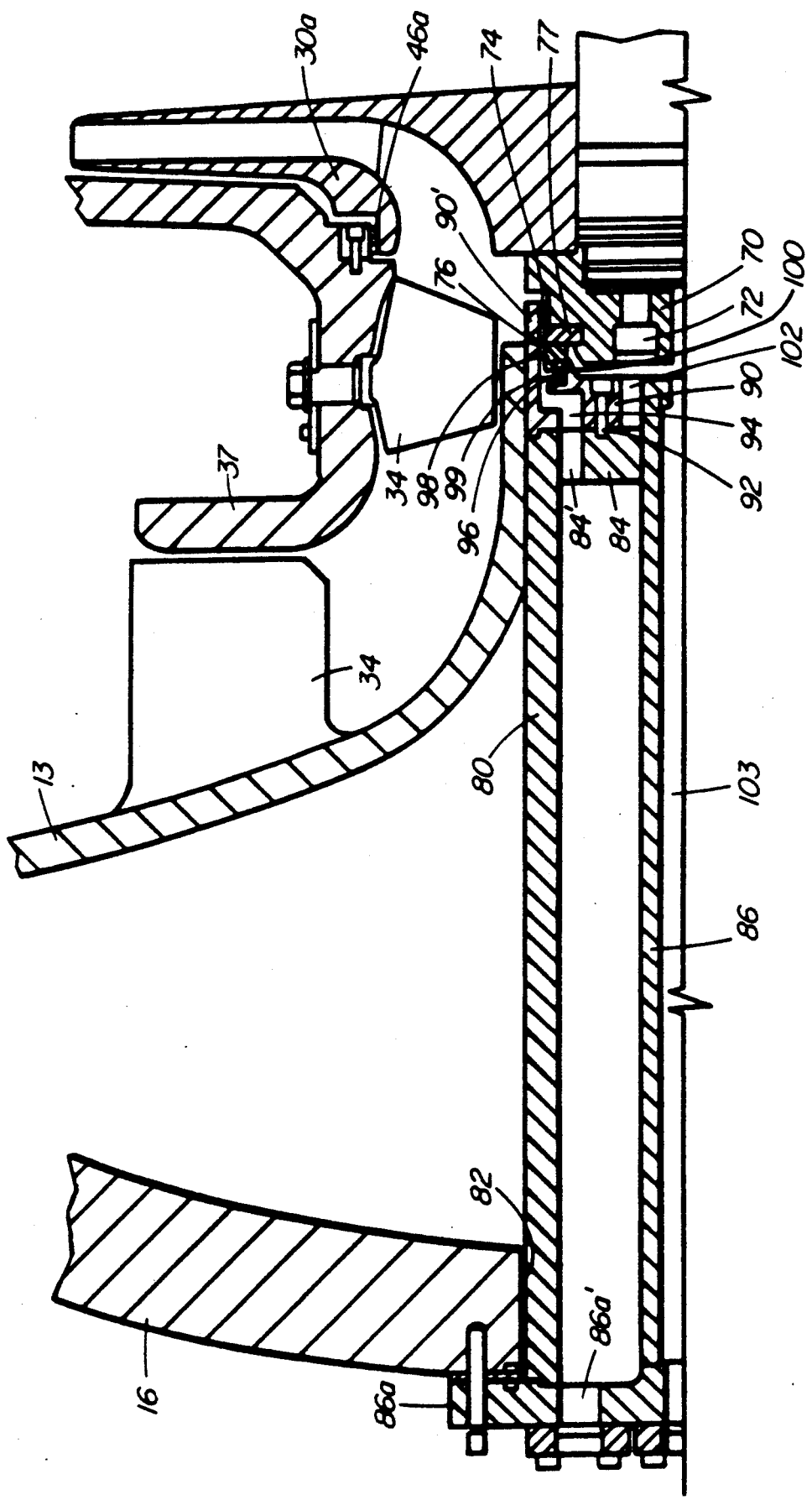
FIG. 2 is an enlarged view of the shaft sealing arrangement at the front end of the compressor.

Referring to FIG. 2, it will be seen that the impeller 30a is held in place on the shaft by a ring member 70 held by bolts 72. This ring member 70 carries parts of firstly an auxiliary labyrinth seal 74, and secondly of a dry gas seal 76, which are further described below.

A tubular member 80 extends, co-axially of shaft 22, from an aperture 82 in the compressor door 16 to a tubular recess provided at the inner rear end of inlet volute 13 which provides a close fit over member 80. The inner end of member 80 has an internal flange 84 the inner surface of which supports a tube 86, the outer end of which has flange 86a fixed to the door 16 around the aperture 82. The flange 86a is apertured at 86a', and the flange 84 is apertured at 84', to allow filtered gas to pass along the annular space between tubular member 80 and tube 86. At the inner end of member 80 a ring member 90 is provided held in place against flange 84 by bolts 92. This ring member is provided with passageways 94 which communicate with passageways 84' in flange 84. This ring member holds the stationary parts of the auxiliary labyrinth seal 74 and the dry gas seal 76. The former is Provided by a cylindrical extension 90' of the ring member 90 which fits over ring 70. Spaced within this part 90' the main part of ring member 90 is provided with an outwardly and forwardly facing recess 96 which carries the non-rotating part of stator 98 of the dry gas seal 76. This part is normally made of graphite, and is urged against the rotor part 77 by a light spring 99; an O-ring 100 ensures that gas supplied through duct 94 passes either into the suction inlet of the compressor via the labyrinth seal 74, or passes through the very narrow space between the rotor and stator of dry gas seal 76 and from there into inner gas space 102 at the front of the shaft. This space 102 is vented through vent passageway 103 in the centre of the tube 86.

In use, clean (filtered) process gas at a pressure slightly higher than the suction pressure of the compressor is fed into the tubular member 80 through passageway 86a', and then passes through passage 94 to the 1; auxiliary labyrinth seal 74 and the dry seal 76. The majority of this gas (10-15 SCFM) will pass through the labyrinth seal into the suction inlet of the first stage impeller; this prevents any dirty process gas from entering the dry seal 76. A small amount of the gas passes through the dry gas seal 76 and into inner gas space 102. Even if space 102 is vented to atmosphere, the loss of gas through the dry gas seal is extremely small. With this arrangement, all of the shaft front end within the inner boundary of the 0-ring 100 may be subjected only to atmospheric pressure, and only an outer annular portion of the front end of the shaft is subjected to pressure equivalent to process gas pressure. The compressor can be operated in this way when the impellers are not subjected to large forces. As the compressor conditions change so that larger quantities of gas are being accelerated by the impellers, the impellers might impose a forwards force on the shaft. This can be counteracted by increasing the pressure in space 102.

The pressure in the inner gas space 102 can be controlled automatically. A signal may be taken which is representative of movement of the shaft caused by changing pressure and gas flow conditions in the compressor. Such a signal may be used to control the flow of gas from a chamber connected to the vent passageway 103. Such operation allows the pressure in the space 102 to be varied from atmospheric to up to suction pressure depending on the signal received from the magnetic thrust bearing. By this means, overload conditions on the thrust bearing can be avoided for a wide variety of compressor operational conditions. An identical arrangement could be used on conventional oil thrust bearings, e.g. using the thrust pad temperature signal as a control signal.

What is claimed is:

1. A gas compressor having a housing which defines a duct for pressurized gas extending between a suction inlet and a discharge outlet, an impeller assembly within said duct and rotatable to move gas through said duct from the suction inlet to the discharge outlet end, the impeller assembly being of the overhung type having a shaft mounted on front and rear bearings and having at least one impeller mounted between the front bearing and a forwardly directed end face of the shaft, annular sealing means being provided at the front end of the impeller assembly and coaxial therewith, said sealing means including a first seal acting between said housing and said impeller assembly to inhibit the flow of process gas between said suction inlet and a load control zone located in advance of the end face of said shaft, a second seal to divide said load control zone into first and second chambers, means for supplying clean pressurized process gas to one of said chambers, and means for venting the other of said chambers to control the pressure therein, said end face being located in said other chamber whereby pressure in said other chamber determines gas thrust forces exerted on the shaft end face.

2. A gas compressor according to claim 1, wherein said load control zone is provided by a tubular member which extends from the adjacent end of the housing and which is surrounded by the suction inlet.

3. A gas compressor according to claim 1 wherein pressure in said one chamber is higher than pressure in said suction inlet.

4. A gas compressor according to claim 1 wherein said first seal is located between said suction inlet and said one chamber.

5. A gas compressor according to claim 4 wherein said second seal is located radially inwardly of said first seal.

6. A gas compressor according to claim 2 wherein sleeve is located within said tubular member and said first chamber is provided between said tubular member and said sleeve.

7. A gas compressor according to claim 6 wherein said second chamber is provided within said sleeve.

8. A gas compressor according to claim 7 wherein said second seal is operable between said sleeve and said impeller assembly.

9. A gas compressor according to claim 8 wherein said one chamber is said first chamber and said other chamber is said second chamber.

10. A gas compressor according to claim 9 wherein said first seal is a labyrinth seal carried by said tubular member and cooperating with said impeller assembly to inhibit flow of gas from said suction inlet into said tubular member.

11. A gas compressor according to claim 10 wherein said second seal is a dry gas seal operable to provide controlled flow between said first and second chambers.

12. A gas compressor according to claim 1 wherein said second seal is a dry gas seal operable to permit a controlled flow of gas between said first and second chambers.

13. A gas compressor according to claim 12 wherein said first chamber is located radially outwardly of said second chamber.

14. A gas compressor according to claim 13 wherein said first seal is located in said first chamber.

15. A gas compressor according to claim 14 wherein said pressurized process gas is supplied to said first chamber and said second chamber is vented.

16. A gas compressor according to claim 15 wherein said first and second seals cooperates with said impeller assembly at radially spaced locations.

* * * * *